United States Patent
Kunigita et al.

(10) Patent No.: US 9,055,272 B2
(45) Date of Patent: Jun. 9, 2015

(54) MOVING IMAGE REPRODUCTION APPARATUS, INFORMATION PROCESSING APPARATUS, AND MOVING IMAGE REPRODUCTION METHOD

(71) Applicant: Sony Computer Entertainment Inc., Tokyo (JP)

(72) Inventors: Hisayuki Kunigita, Kanagawa (JP); Seung-Hyun Lee, Kyunggi-do (KR); Taek-Joo Lee, Song-Pa (KR); Ju-Yeong Ji, Seocho-gu (KR)

(73) Assignees: Sony Corporation, Tokyo (JP); Sony Computer Entertainment Inc., Tokyo (JP)

( * ) Notice: Subject to any disclaimer, the term of this patent is extended or adjusted under 35 U.S.C. 154(b) by 115 days.

(21) Appl. No.: 13/859,244

(22) Filed: Apr. 9, 2013

(65) Prior Publication Data

US 2013/0223813 A1 Aug. 29, 2013

Related U.S. Application Data

(63) Continuation of application No. PCT/JP2011/005685, filed on Oct. 11, 2011.

(30) Foreign Application Priority Data

Oct. 14, 2010 (JP) ................................. 2010-231698

(51) Int. Cl.
*H04N 9/80* (2006.01)
*H04N 9/79* (2006.01)
(Continued)

(52) U.S. Cl.
CPC ........... *H04N 9/79* (2013.01); *H04N 21/23424* (2013.01); *H04N 21/2387* (2013.01);
(Continued)

(58) Field of Classification Search
CPC .................. H04N 21/23424; H04N 21/23439; H04N 21/8456
USPC ........................................................ 386/241
See application file for complete search history.

(56) References Cited

U.S. PATENT DOCUMENTS

2006/0034583 A1 2/2006 Shimizu
2008/0155586 A1 6/2008 Yang
(Continued)

FOREIGN PATENT DOCUMENTS

JP 2004104704 A 4/2004
JP 2005033556 A 2/2005
(Continued)

OTHER PUBLICATIONS

International Search Report for corresponding PCT Application No. PCT/JP2011/005685, dated Nov. 8, 2011.
(Continued)

*Primary Examiner* — Thai Tran
*Assistant Examiner* — Jose Mesa
(74) *Attorney, Agent, or Firm* — Matthew B. Dernier, Esq.; Gibson & Dernier LLP

(57) ABSTRACT

A moving image reproduction apparatus is provided with a reproduction unit that decodes pictures included in a chunk of a video stream and displays the decoded pictures and a control unit that gives an instruction to start the reproduction process. When a reproduction target is switched to a second video stream that corresponds to a second bit rate during the reproduction of a first video stream that corresponds to a first bit rate, the reproduction unit continues to reproduce a chunk of the first video stream that is being reproduced. The control unit instructs, when pictures included in a chunk of the second video stream overlap with pictures included in the chunk that is being reproduced, the reproduction unit to hide the overlapping pictures in a reproduction process performed on the chunk of the second video stream.

7 Claims, 7 Drawing Sheets

(51) Int. Cl.
   H04N 21/234    (2011.01)
   H04N 21/2387   (2011.01)
   H04N 21/262    (2011.01)
   H04N 21/442    (2011.01)
   H04N 21/2343   (2011.01)
   H04N 21/43     (2011.01)
   H04N 21/845    (2011.01)
   H04N 19/61     (2014.01)
   H04N 19/44     (2014.01)

(52) U.S. Cl.
   CPC ... *H04N21/26258* (2013.01); *H04N 21/44209* (2013.01); *H04N 21/23439* (2013.01); *H04N 21/4302* (2013.01); *H04N 21/8456* (2013.01); *H04N 19/61* (2014.11); *H04N 19/44* (2014.11)

(56) References Cited

U.S. PATENT DOCUMENTS

| | | |
|---|---|---|
| 2009/0022154 A1 | 1/2009 | Kiribe |
| 2009/0235318 A1 | 9/2009 | Amsterdam |
| 2009/0328124 A1 | 12/2009 | Khouzam |
| 2010/0135392 A1 | 6/2010 | Kim |
| 2010/0161825 A1* | 6/2010 | Ronca et al. ................... 709/231 |
| 2011/0072105 A1* | 3/2011 | Biderman et al. ............ 709/217 |

FOREIGN PATENT DOCUMENTS

| | | |
|---|---|---|
| JP | 2008193654 A | 8/2008 |
| JP | 2009027429 A | 2/2009 |
| JP | 2010193131 A | 9/2010 |
| WO | 2005006748 A1 | 1/2005 |
| WO | 2007038695 A2 | 4/2007 |

OTHER PUBLICATIONS

International Preliminary Report on Patentability for corresponding PCT Application No. PCT/JP2011/005685, dated May 8, 2013.

Office Action for corresponding JP Application 2010-231698, dated Apr. 9, 2013.

European Search Report for corresponding EP Application No. 11832277, dated May 26, 2014.

* cited by examiner

MOVING IMAGE DISTRIBUTION SYSTEM 100

MOVING IMAGE REPRODUCTION APPARATUS, INFORMATION PROCESSING APPARATUS, AND MOVING IMAGE REPRODUCTION METHOD

BACKGROUND OF THE INVENTION

1. Field of the Invention

The present invention relates to a data processing technology and, more particularly, to a technology for reproducing a moving image.

2. Description of the Related Art

In recent years, a streaming technology has been suggested in which a web server distributes several different types of coded data (hereinafter, also referred to as "video streams") obtained by coding a moving image at several different types of video bit rates and in which a web client reproduces the moving image while dynamically switching the type of video streams. This technology is also referred to as "adaptive streaming". In the present specification, the technology is also referred to as "adaptive streaming" in the following.

The present inventors have realized that, in adaptive streaming, a plurality of types of video streams that correspond to different bit rates are not always coded in such a manner that the video streams are mutually compatible and that, as a result, there are cases where there is a disturbance of the display of a moving image when the type of a video stream to be reproduced is switched in a web client.

SUMMARY OF THE INVENTION

In this background, a purpose of the present invention is to provide a technology for preventing the disturbance of the display of a moving image that occurs when the type of video streams to be reproduced is switched in adaptive streaming.

A moving image reproduction apparatus according to one embodiment of the present invention includes: an acquisition unit configured to acquire, from a server that concurrently distributes a plurality of types of video streams in which a moving image is coded at a plurality of types of bit rates and that distributes each video stream in chunks including a plurality of pictures that constitute the moving image, a chunk of a video stream that corresponds to any one bit rate; an acquisition control unit configured to indicate to the acquisition unit the type of the video stream to be acquired; a reproduction unit configured to decode pictures included in the acquired chunk and to display the decoded pictures during a reproduction process of reproducing the video stream; and a reproduction control unit configured to instruct the reproduction unit to start the reproduction process. When a reproduction target is switched to a second video stream, which corresponds to a second bit rate, during the reproduction of a first video stream, which corresponds to a first bit rate, the reproduction unit continues to reproduce a chunk of the first video stream being reproduced, the acquisition control unit instructs the acquisition unit to acquire the second video stream instead of the first video stream, a time stamp that indicates a display time of a picture in the moving image is associated, respectively, in advance with each picture included in a chunk of the first video stream and each picture included in a chunk of the second video stream, and the reproduction control unit detects, based on respective time stamps associated with pictures included in a chunk of the second video stream and respective time stamps associated with pictures included in a chunk of the first video stream being reproduced, pictures that overlap between pictures included in a chunk of the second video stream and pictures included in the chunk of the first video stream being reproduced and instructs the reproduction unit to hide the overlapping pictures during a reproduction process performed on a chunk of the second video stream.

Another embodiment of the present invention relates to an information processing apparatus. The apparatus includes: a main processor configured to control the entire apparatus in an integrated manner; and a graphics processor configured to perform an image processing operation. The main processor acquires, from a server that concurrently distributes a plurality of types of video streams in which a moving image is coded at a plurality of types of bit rates and that distributes each video stream in chunks including a plurality of pictures that constitute the moving image, a chunk of a video stream that corresponds to any one bit rate and then performs a process of instructing the graphic processor to start a reproduction process of reproducing the acquired chunk of the video stream. The graphics processor performs a process of decoding pictures included in the acquired chunk and displaying the decoded pictures during the reproduction process of reproducing the video stream. When a reproduction target is switched to a second video stream, which corresponds to a second bit rate, during the reproduction of a first video stream, which corresponds to a first bit rate, the graphics processor continues to reproduce a chunk of the first video stream being reproduced, a time stamp that indicates a display time of a picture in the moving image is associated, respectively, in advance with each picture included in a chunk of the first video stream and each picture included in a chunk of the second video stream, and the main processor acquires the second video stream instead of the first video stream, detects, based on respective time stamps associated with pictures included in a chunk of the second video stream and respective time stamps associated with pictures included in a chunk of the first video stream being reproduced, pictures that overlap between pictures included in a chunk of the second video stream and pictures included in the chunk of the first video stream being reproduced, and instructs the graphics processor to hide the overlapping pictures during a reproduction process performed on a chunk of the second video stream.

Still another embodiment of the present invention relates to a moving image reproduction method. The method includes: acquiring, from a server that concurrently distributes a plurality of types of video streams in which a moving image is coded at a plurality of types of bit rates and that distributes each video stream in chunks including a plurality of pictures that constitute the moving image, a chunk of a first video stream that corresponds to a first bit rate; decoding pictures included in the chunk and displaying the decoded pictures during a reproduction process of reproducing the first video stream; and acquiring, when a reproduction target is switched to a second video stream that corresponds to a second bit rate during the reproduction of the first video stream, a chunk of the second video stream; wherein a time stamp that indicates a display time of a picture in the moving image is associated, respectively, in advance with each picture included in a chunk of the first video stream and each picture included in a chunk of the second video stream, and comprising: performing a reproduction process of reproducing the second video stream, wherein, based on respective time stamps associated with pictures included in a chunk of the second video stream and respective time stamps associated with pictures included in a chunk of the first video stream being reproduced, pictures that overlap between pictures included in a chunk of the second video stream and pictures included in the chunk of the first video stream being reproduced are detected, and wherein the overlapping pictures are hidden.

Optional combinations of the aforementioned constituent elements, or implementations of the invention in the form of apparatuses, methods, systems, programs, and recording mediums storing programs may also be practiced as additional modes of the present invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

The invention will now be described by reference to the preferred embodiments. This does not intend to limit the scope of the present invention, but to exemplify the invention.

A brief description is now given before explaining the configuration of the present embodiment.

In adaptive streaming, a video stream to be reproduced is switched among video streams that correspond to bit rates that are different from one another. In this case, in order to prevent the disturbance of the display of a moving image for smooth switching, it has been necessary that all the respective temporal positions (PTS: Presentation Time Stamp) of sync samples match one another. A sync sample is a sample (picture) that allows all subsequent samples to be correctly decoded when decoding is started from the sample and corresponds to an IDR picture in AVC (Advanced Video Coding). A PTS indicates a temporal position for displaying a picture in the entire moving images, in other words, the display time of the picture in the moving images.

Figure 1A:
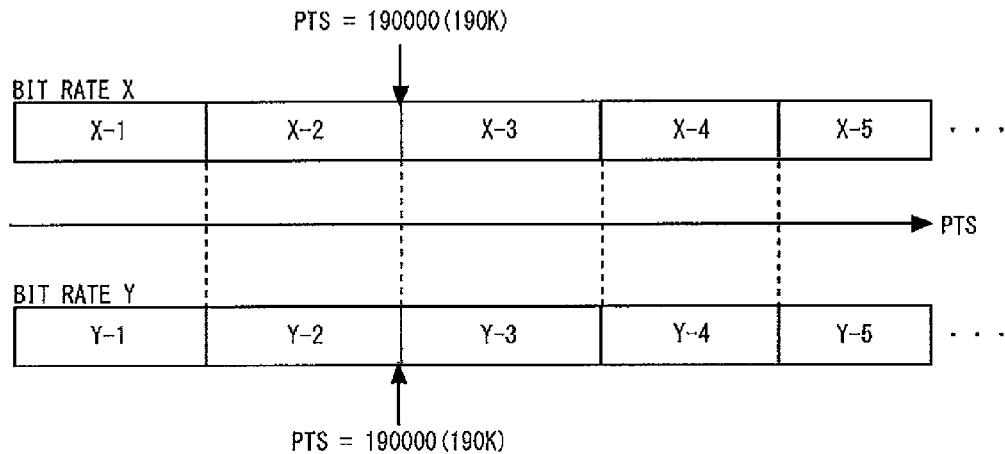
FIG. 1A is a diagram illustrating an example where the PTSs of respective sync samples match each other.

FIG. 1A illustrates an example where the PTSs of respective sync samples match each other. The upper row in the figure shows a video stream coded at a bit rate X (e.g., 8 Mbps). The video stream is distributed in units of groups (hereinafter, also referred to as "chunks") including a plurality of pictures that constitute a moving image. In other words, distribution occurs in series in order of a chunk X-1, a chunk X-2, . . . , a chunk X-5. The lower row in the figure shows a video stream coded at a bit rate Y (e.g., 4 Mbps). The video stream is also distributed in units of chunks. In other words, distribution occurs in series in order of a chunk Y-1, a chunk Y-2, . . . , a chunk Y-5.

To simplify the explanation, it is assumed in the present embodiment that a plurality of pictures included in (a chunk of) a video stream are displayed in display order and that a PTS is assigned for each picture. It is also assumed that a first picture of a chunk is a sync sample (e.g., an IDR picture in AVC).

It is now assumed that, while the PTSs of respective sync samples match among video streams of different bit rates as shown in FIG. 1A, the type of a video stream to be reproduced is switched to a bit rate Y during the reproduction of the chunk X-2. In the figure, the position (PTS=190 K) of a sync sample of a chunk X-3 matches the position (PTS=190 K) of a sync sample of a chunk Y-3. Therefore, a picture that is displayed at the end in the chunk X-2 and a picture that is displayed first in the chunk Y-3 are successive. Thus, if the chunk Y-3 is directly displayed after the display of the chunk X-2, a moving image will be displayed smoothly throughout the switching of the video stream. In other words, no overlapping image will be repeatedly displayed, or no part of an image will be hidden.

Figure 1B:
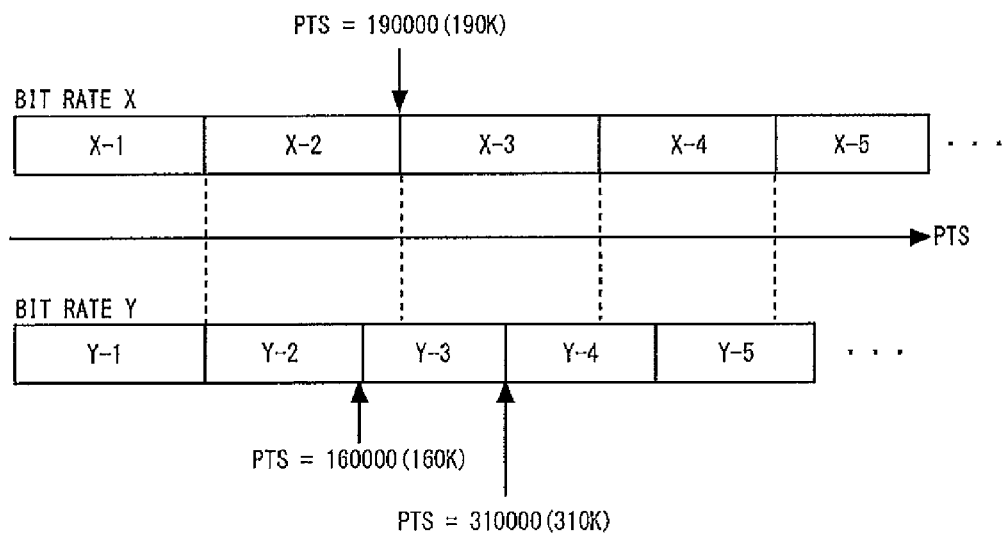
FIG. 1B is a diagram illustrating an example where the PTSs of respective sync samples do not match each other.

However, in the present circumstances, the PTSs of respective sync samples do not always match among video streams of different bit rates. FIG. 1B illustrates an example where the PTSs of respective sync samples do not match each other. It is now assumed that the type of a video stream to be reproduced is switched to a bit rate Y during the reproduction of a chunk X-2 in the figure. In the figure, neither the position (PTS=160 K) of a sync sample of a chunk Y-3 nor the position (PTS=310 K) of a sync sample of a chunk Y-4 matches the position (PTS=190 K) of a sync sample of a chunk X-3. In such a case, there has been no other choice but either to perform reproduction from the start of the chunk Y-3 or to perform reproduction from the start of the chunk Y-4, previously. In the former case, images at PTS=160 K through 190 K will be repeatedly displayed. In the latter case, images at PTS=190 K through 310 K will be hidden.

The present embodiment suggests a moving image reproduction technology in which, when a reproduction target is switched to a video stream of a bit rate Y during the reproduction of a chunk (e.g., chunk X-2) in a video stream of a bit rate X, pictures (e.g., pictures of PTS of from 160 K to 190 K) that overlap with pictures displayed by the reproduction of the chunk X-2 among pictures included in a chunk (e.g., chunk Y-3) in a video stream of the bit rate Y are hidden. This prevents overlapping images from being displayed repeatedly and prevents images to be originally displayed from being hidden at the time of changing the type of a video stream even when the PTSs of respective sync samples do not match among video streams of different bit rates.

Figure 2:
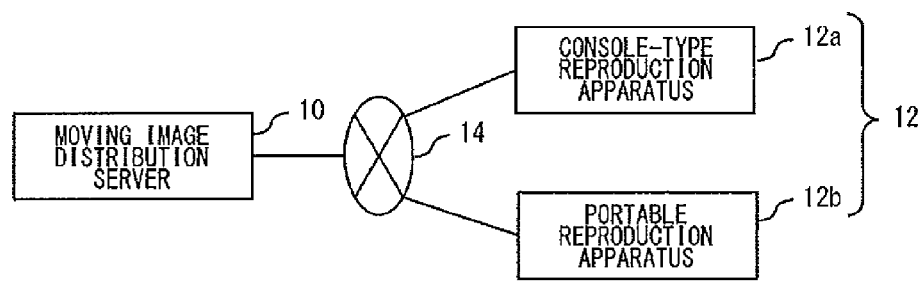
FIG. 2 is a diagram illustrating the configuration of a moving image distribution system according to an embodiment.

FIG. 2 illustrates the configuration of a moving image distribution system according to an embodiment. A moving image distribution system 100 is provided with a moving image distribution server 10 and a console-type reproduction apparatus 12a and a portable reproduction apparatus 12b, which are generically referred to as moving image reproduction apparatuses 12. A moving image reproduction apparatus 12 becomes connected to the moving image distribution server 10 via a publicly-known communication network 14 such as LAN, WAN, Internet, etc.

The moving image distribution server 10 is a server that stores a plurality of types of coded data obtained by coding moving images at a plurality of types of bit rates. In the present embodiment, it is assumed that the moving image distribution server 10 is a web server. For example, the moving image distribution server 10 stores coded data that correspond to each of bit rates of 256 Kbps, 512 Kbps, 1 Mbps, 4 Mbps, and 8 Mbps. The moving image distribution server 10 concurrently distributes a plurality of types of coded data to the moving image reproduction apparatus 12 as video streams. In the distribution of each video stream, the data is transmitted in units of chunks preset for each video stream. For the coding of a moving image, a publicly-known moving-image compression coding technique may be applied. For example, MPEG (Moving Picture Experts group) or H.264/AVC may be applied.

The moving image reproduction apparatus 12 is an information processing apparatus equipped with a web browser. The moving image reproduction apparatus 12 accesses the moving image distribution server 10 via the web browser and requests the distribution of video streams. The moving image reproduction apparatus 12 dynamically switches, according to a change in the own apparatus environment, the type of video streams to be acquired and reproduced and acquires and reproduces video streams of a bit rate that is suitable for the current apparatus environment so as to display a moving image. The console-type reproduction apparatus 12a may be a game console or a commonly-used PC. The portable reproduction apparatus 12b may be a portable game device, a mobile phone terminal, a mobile information terminal, or a smartphone.

Figure 3:
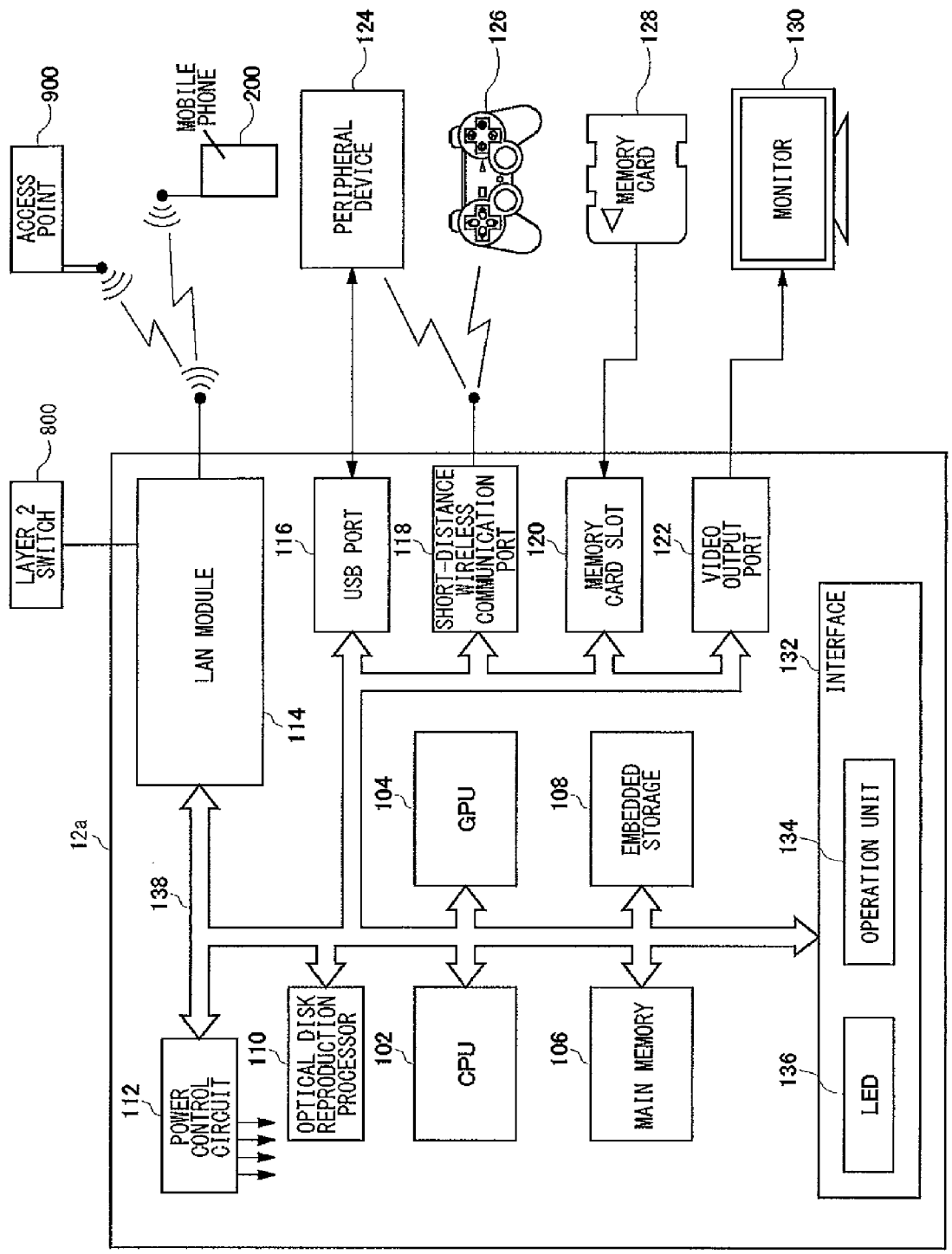
FIG. 3 is a diagram illustrating the configuration of the internal circuit of a console-type reproduction apparatus shown in FIG. 2.

FIG. 3 is a block circuit diagram illustrating the configuration of the internal circuit of a console-type reproduction apparatus 12a shown in FIG. 3. The figure shows a configuration mainly intended for a game console. The console-type reproduction apparatus 12a includes a CPU (Central Processing Unit) 102, a GPU (Graphics Processing Unit) 104, a main memory 106, an embedded storage 108, an optical disk reproduction processor 110, a power control circuit 112, and a LAN module 114 as a basic configuration.

The CPU 102 is a main processor serving as a general-purpose processor that controls the entire console-type reproduction apparatus 12a in an integrated manner, and the CPU 102 controls signal processing and internal components based on various programs for a game, an e-mail, and an application for a web browser, and the like. The GPU 104 is a graphics processor serving as a dedicated processor designed to efficiently perform an image processing operation and performs an image process in the console-type reproduction apparatus 12a. The optical disk reproduction processor 110 reproduces an optical disk such as a BD (Blu-ray Disc, registered trademark), a DVD, or a CD, which is inserted in an optical disk reproducing unit (not shown) and in which an application program or multimedia data is recorded. The main memory 106 functions as a work area of the CPU 102, and as a buffer that temporarily stores data read from an optical disk.

The LAN module 114 has functions of a wireless LAN module and functions of a wired LAN module and transmits and/or receives data between the console-type reproduction apparatus 12a and an external apparatus thereof. For example, the LAN module 114 communicates with a mobile phone 200 and an access point 900 as a wireless LAN module and communicates with a layer 2 switch 800 as a wired LAN module.

The console-type reproduction apparatus 12a includes a USB port 116, a short-distance wireless communication port 118, a memory card slot 120, and a video output port 122. The USB port 116 is used for the connection with a peripheral device 124 such as an external hard disk or the like. In addition to wirelessly connecting to the peripheral device 124, the short-distance wireless communication port 118 connects to a controller 126 of the console-type reproduction apparatus 12a. The controller 126 can be also connected to the USB port 116. The memory card slot 120 exchanges information between the console-type reproduction apparatus 12a and a memory card 128 that can be attached and removed. The embedded storage 108 stores, for example, save data of an application program or a game read from an optical disk or stores data or the like of a picture, a moving image, music, etc., acquired via the USB port 116, the short-distance wireless communication port 118, or the memory card slot 120.

The GPU 104 has a function of a geometry transfer engine for processing coordinate transformation or the like and a function of a rendering processor, performs rendering in accordance with a rendering instruction from the CPU 102, and stores a rendered image in a frame buffer (not shown). In other words, for example, when the various types of application programs recorded in an optical disk are those that use so-called three dimensional (3D) graphics as in a game, the GPU 104 calculates the coordinate, etc., of a polygon for forming a three-dimensional object by a geometric calculation process. Further, the GPU 104 performs a calculation for generating an image obtained by capturing an image of the three-dimensional object by a virtual camera, in other words, performs a calculation of perspective transformation (a calculation of coordinate values when the vertices of each polygon forming the three-dimensional object are projected on a virtual camera screen) by a rendering process. The GPU 104 writes image data obtained at the end to a frame buffer. The video output port 122 outputs, to a monitor 130 of a television set, a video signal corresponding to the image generated by the GPU 104.

An interface 132 of the console-type reproduction apparatus 12a includes an operation unit 134 for turning on a power source and removing an optical disk and an LED 136 for displaying an on/off status of the power source, an access status of various types of devices, and the like.

These components are mutually connected to one another mainly via a bus line 138. To the above internal circuit of the console-type reproduction apparatus 12a, electricity is provided for driving from a power source (not shown). The CPU 102 and the GPU 104 are connected via a dedicated bus. In the console-type reproduction apparatus 12a having a configuration such as the one described above, when the power is turned on, an operating system program is loaded into the main memory 106 from a mask ROM (not shown), and the CPU 102 executes the operating system program. This allows the CPU 102 to control the components of the console-type reproduction apparatus 12a in an integrated manner.

Upon the execution of the operating system program, the CPU 102 first performs an initializing process such as an operation check or the like. The main CPU 102 then reads an application program such as a game that is recorded in an optical disk and then executes the game application program after loading the application program into the main memory 106. By the execution of the game application program, the CPU 102 controls the GPU 104 and the like so as to control the display of an image and the generation of a sound effect and a music sound in accordance with a user instruction received from the controller 126.

Figure 4:
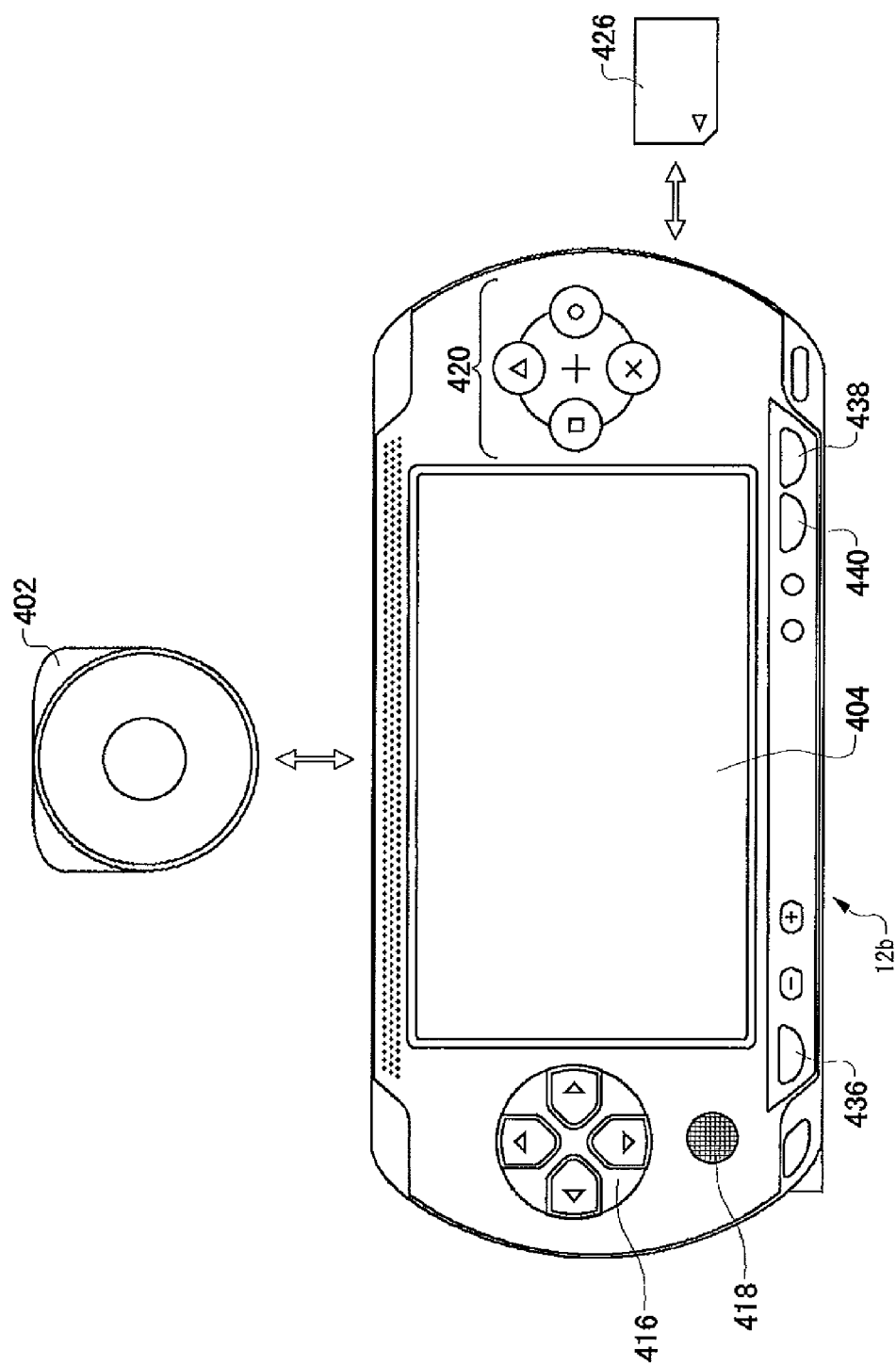
FIG. 4 is a diagram illustrating the exterior view of a portable reproduction apparatus shown in FIG. 2.

FIG. 4 illustrates the exterior view of the portable reproduction apparatus 12b shown in FIG. 2. The figure shows a configuration mainly intended for a portable game device. In addition to the reproduction of digital content of a moving image, a still image, music, etc., the portable reproduction apparatus 12b can also execute content of a game program or the like. Each item of content is mainly read from an external recording medium that can be attached to and removed from the portable reproduction apparatus 12b. External recoding mediums according to the present embodiment are a compact optical disk 402 and a memory card 426. The compact optical disk 402 and the memory card 426 are each loaded in a driving apparatus (not shown) provided in the portable reproduction apparatus 12b. The compact optical disk 402 can store relatively large moving image data of movies, etc., as well as music data and still image data. The memory card 426 is a compact memory card that can be attached to and removed from a digital camera and a mobile phone and mainly stores data that is generated using another apparatus by the user and data that can be exchanged with another apparatus such as still image data, moving image data, audio data, and the like.

The portable reproduction apparatus 12b is provided with a liquid crystal display 404 and keys such as directional keys 416, an analog stick 418, and button keys 420. The user holds the left and right ends of the portable reproduction apparatus 12b, gives vertical and horizontal directions by using the directional keys 416 or the analog stick 418 mainly by a left-hand thumb, and gives various types of operations by using the button keys 420 mainly by a right-hand thumb. Different from the directional keys 416 and the button keys 420, a home button 436 is provided at a position where it is hard to press the home button 436 by any of the fingers when the left and right ends of the portable reproduction apparatus 12b are held with both hands so as to prevent operational error. The liquid crystal display 404 displays a menu screen image and a reproduction screen image of each item of content by a graphical user interface. The portable reproduction apparatus 12b is provided with a USB port and a wireless LAN communication function and transmits and receives data to and from another apparatus (including another apparatus on the Internet) via these port and communication function. Further, the portable reproduction apparatus 12b may be provided with an infrared port so as to have a structure for transmitting and receiving data to and from another apparatus via infrared communication.

The portable reproduction apparatus 12b is provided with a select button 440, a start button 438, and the like. The start button 438 is used by the user to give instructions to, for example, start a game, start displaying an email screen image, or start or temporarily stop reproducing a movie or music. The select button 440 is used by the user to give instructions to, for example, select a menu display displayed on the liquid crystal display 404.

Figure 5:
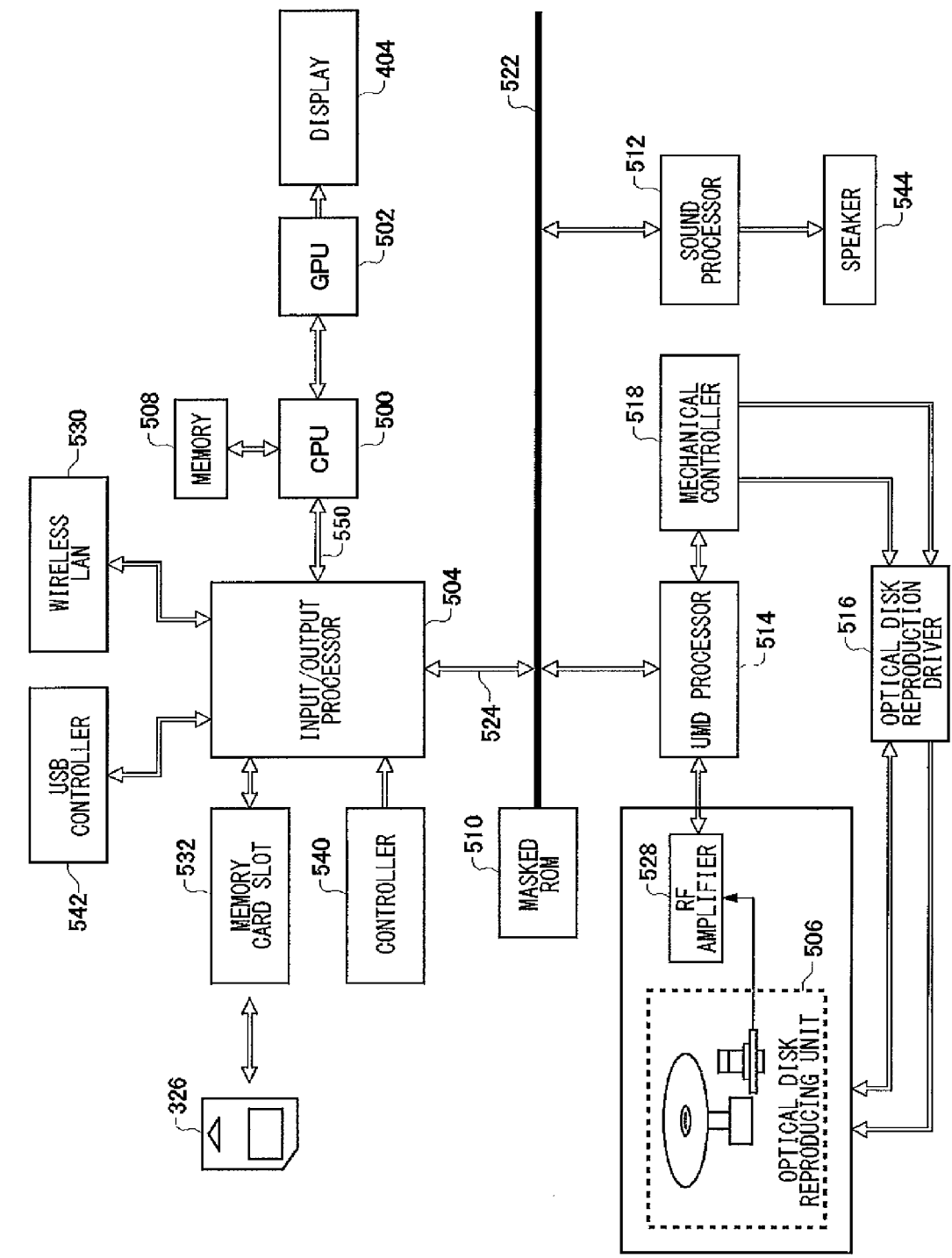
FIG. 5 is a diagram illustrating the configuration of the internal circuit of the portable reproduction apparatus shown in FIG. 2.

FIG. 5 illustrates the configuration of the internal circuit of the portable reproduction apparatus 12b shown in FIG. 2. The portable reproduction apparatus 12b is provided with a main CPU 500, a GPU 502, an input/output processor 504, an optical disk reproducing unit 506, a main memory 508, a masked ROM 510, and a sound processor 512, as the basic components thereof. The main CPU 500 is a main processor serving as a general-purpose processor that controls the entire portable reproduction apparatus 12b in an integrated manner, and the CPU 500 controls signal processing and internal components based on various programs for a game, an e-mail, and an application for a web browser, and the like. The GPU 502 is a graphics processor serving as a dedicated processor designed to efficiently perform an image processing operation and performs an image process in the portable reproduction apparatus 12b.

The input/output processor 504 performs an interface process between the outside and the inside of the apparatus or a process for maintaining backward compatibility. The optical disk reproducing unit 506 reproduces an optical disk such as a UMD in which an application program or multimedia data is recorded. The main memory 508 functions as a buffer that temporarily stores data read from a work area of the main CPU 500 or from an optical disk. The masked ROM 510 mainly stores an operating system program that is executed by the main CPU 500 or the input/output processor 504. The sound processor 512 processes an audio signal.

This portable reproduction apparatus 12b also has a UMD processor 514, an optical disk reproduction driver 516, and a mechanical controller 518. The UMD processor 514 reproduces (or restores) data recorded in a UMD by performing, for example, an error correcting process (e.g., a CIRC process), a decompression/decoding process, or the like on a disk reproduction signal, which is read from the UMD by the optical disk reproducing unit 506 and then amplified by an RF amplifier 528. The optical disk reproduction driver 516 and the mechanical controller 518 perform rotation control of a spindle motor of the optical disk reproducing unit 506, focus/tracking control of optical pickup, loading control of a disk tray, and the like.

These components are mutually connected to one another mainly via bus lines 522 and 524 or the like. The main CPU 500 and the GPU 502 are connected via a dedicated bus. The main CPU 500 and the input/output processor 504 are connected via a bus 550. The input/output processor 504, the UMD processor 514, the masked ROM 510, and the sound processor 512 are each connected to the bus 522.

The main CPU 500 controls all operations of the portable reproduction apparatus 12b by executing an operating system program for the main CPU that is stored in the masked ROM 510. The main CPU 500 executes various types of application programs, etc., that are read from an optical disk of a UMD or the like and loaded into the main memory 508 or that are downloaded via a wireless LAN 530 and controls the operation of, for example, executing a game, and composing and editing an email, and browsing a Web page.

By executing an operating system program for the input/output processor that is stored in the masked ROM 510, the input/output processor 504 controls the input and output of a signal or a setting of a game provided from a controller 540 in accordance with the operation by the user, the contents or the address of an email, data or the like from a memory card 326 that stores the URL of a Web site or the like via a memory card slot 532 and, in addition, the input and output of data in a USB connecting terminal 542, a wireless LAN 530, and the like. The controller 540 is a general term for keys such as the directional keys 416, the analog stick 418, and the button keys 420 used for controlling the portable reproduction apparatus 12b by the user.

The GPU 502 has a function of a geometry transfer engine for performing a process of coordinate transformation or the like and a function of a rendering processor. The GPU 502 performs rendering in accordance with a rendering instruction from the main CPU 500 and stores a rendered image in a frame buffer (not shown). In other words, for example, when the various types of application programs recorded in an optical disk use so-called three dimensional (3D) graphics as in a game, the GPU 502 calculates the coordinate, etc., of a polygon for forming a three-dimensional object by a geometric calculation. Further, the GPU 502 performs a calculation for generating an image obtained by capturing the three-dimensional object by a virtual camera, in other words, performs perspective transformation (a calculation of coordinate values when vertices of each polygon forming the three-dimensional object are projected on a virtual camera screen) by a rendering process. The image data obtained in the end is written into a frame buffer. The GPU 502 then outputs a video signal that corresponds to the generated image.

The sound processor 512 is provided with an ADPCM (Adaptive Differential Pulse Code Modulation) decoding function, an audio signal reproduction function, a signal modulation function, and the like. The ADPCM decoding function is a function of reproducing and then outputting an audio signal of a sound effect, etc., by reading waveform data stored in a sound buffer (not shown) that is built in or externally attached to the sound processor 512. The signal modulation function operates also as a so-called sampling sound source that generates an audio signal of a music sound, a sound effect, etc., from the waveform data stored in the sound buffer.

In the portable reproduction apparatus 12b having a configuration such as the one described above, for example, when the power is turned on, the operating system programs for the main CPU 500 and for the input/output processor 504 is read from the masked ROM 510. The main CPU 500 and the input/output processor 504 execute respective operating system programs. This allows the main CPU 500 to control the components of the portable reproduction apparatus 12b in an integrated manner. The input/output processor 504 controls the input and output of a signal between the controller 540 and the memory card 526, etc. Upon the execution of the operating system program, the main CPU 500 first performs initialization such as operation checking and the like. The main CPU 500 then controls the optical disk reproducing unit 506 so as to read an application program such as a game that is recorded in an optical disk, load the application program into the main memory 508, and then execute the game application program. In accordance with the user's instruction received from the controller 540 via the input/output processor 504 by the execution of the game application program, the main CPU 500 controls the GPU 502 and the sound processor 512 so as to control the display of an image and the generation of a sound effect and a music sound.

When reproducing a movie or the like recorded in the optical disk, the main CPU 500 controls, in accordance with the user's instruction (command) received from the controller 540 via the input/output processor 504, the GPU 502 and the sound processor 512 so as to control the display of a video image of a movie reproduced from the optical disk and the generation of the sound effect, the music, and the like. A processing result of the GPU 502 is displayed on the liquid crystal display 404, and the sound effect, the music, and the like generated by the sound processor 512 are reproduced by a speaker 544.

Figure 6:
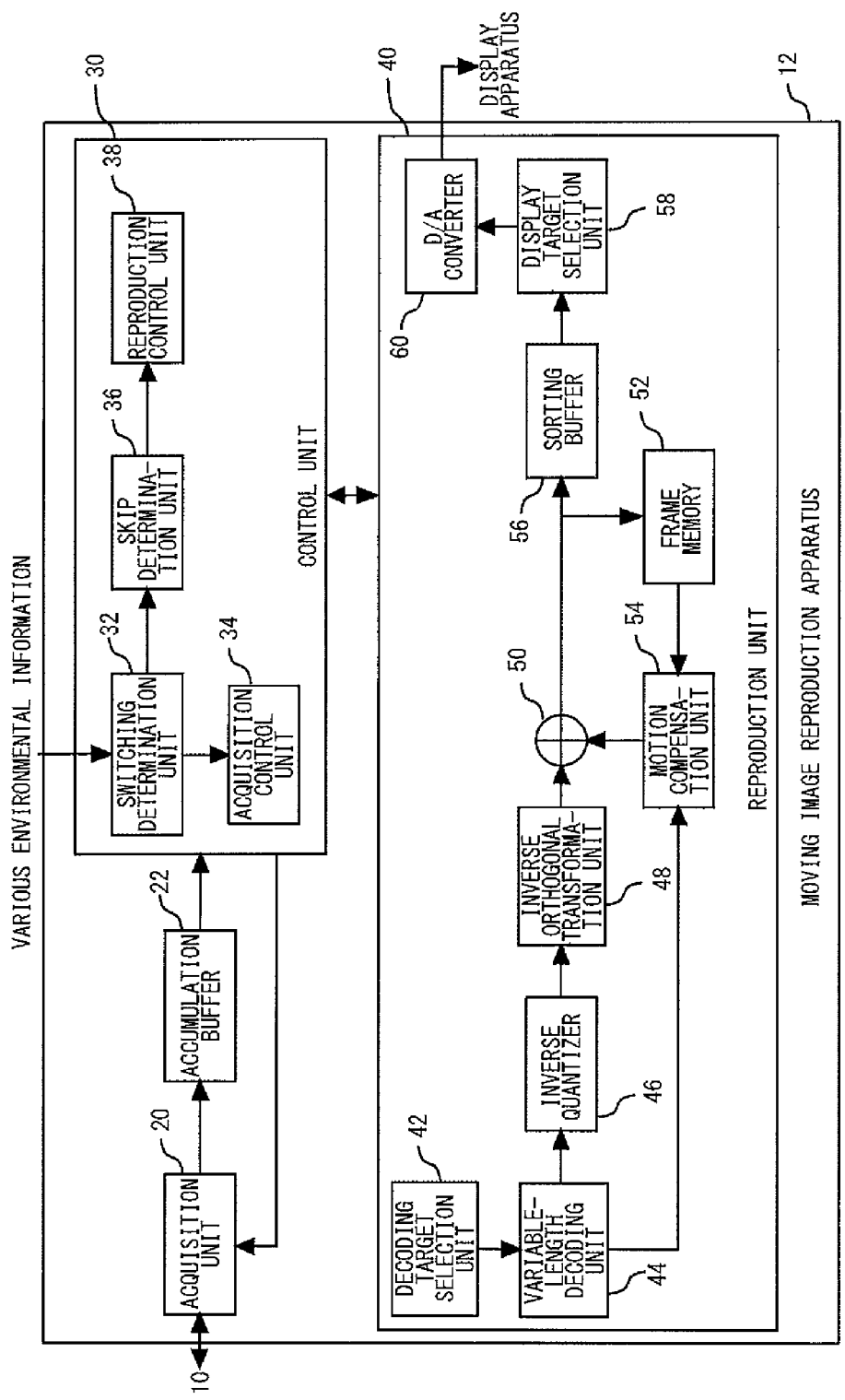
FIG. 6 is a block diagram illustrating a functional configuration of a moving image reproduction apparatus.

FIG. 6 is a block diagram illustrating a functional configuration of a moving image reproduction apparatus 12. The moving image reproduction apparatus 12 is provided with an acquisition unit 20, an accumulation buffer 22, a control unit 30, and a reproduction unit 40. The blocks shown in the block diagram of the specification are implemented in the hardware by any CPU or memory of a computer, other elements, or mechanical apparatuses, and in software by a computer program or the like. FIG. 6 depicts functional blocks implemented by the cooperation of hardware and software. Thus, a person skilled in the art should appreciate that there are many ways of accomplishing these functional blocks in various forms in accordance with the components of hardware, software, or the combination of both.

The acquisition unit 20 acquires, in units of chunks, a video stream of a type specified by the control unit 30 from among a plurality of types of video streams that correspond to a plurality of types of bit rates distributed by the moving image distribution server 10 and stores the acquired video stream in the accumulation buffer 22. More specifically, the acquisition unit 20 requests the moving image distribution server 10 to distribute a video stream of a type specified by the control unit 30 and sequentially receives a plurality of chunks in the video stream of the type from the moving image distribution server 10. The acquisition unit 20 is realized by the cooperation of the CPU 102 and the LAN module 114 shown in FIG. 3 or by the cooperation of the CPU 500 and the wireless LAN 530 shown in FIG. 5. The accumulation buffer 22 is a memory that temporarily stores a chunk of a video stream acquired by the acquisition unit 20.

The control unit 30 controls a process of acquiring a video stream and a process of reproducing the video stream in adaptive streaming in an integrated manner. The control unit 30 is realized by the CPU 102 shown in FIG. 3 or the CPU 500 shown in FIG. 5. The control unit 30 includes a switching determination unit 32, an acquisition control unit 34, a skip determination unit 36, and a reproduction control unit 38.

When a situation is developed, during the reproduction of a first video stream that corresponds to a first bit rate (e.g., 8 Mbps), where a reproduction target is to be switched to a second video stream that corresponds to a second bit rate (e.g., 4 Mbps) different from the first bit rate, the switching determination unit 32 detects the fact. More specifically, the switching determination unit 32 determines whether or not predetermined switching requirements have been satisfied.

These switching requirements may be various types of requirements related to a hardware environment, a software environment, and a communication environment of the moving image reproduction apparatus 12. For example, a switching requirement for switching from a relatively high bit rate to a relatively low bit rate may be a condition where CPU utilization becomes a predetermined threshold value or more. Alternatively, the switching requirement may be a condition where a period of time required for a process of decoding a picture becomes a predetermined value or more or a condition where an available communication bandwidth or effective communication speed becomes less than a predetermined value. Conversely, a switching requirement for switching from a relatively low bit rate to a relatively high bit rate may be a condition where the CPU utilization becomes less than the predetermined threshold value. Alternatively, the switching requirement may be a condition where a period of time required for the process of decoding a picture becomes less than the predetermined value or a condition where the available communication bandwidth or effective communication speed becomes the predetermined value or more. Alternatively, a switching requirement may be the detection of a switching operation entered to the moving image reproduction apparatus 12 by the user, more specifically, a predetermined operation requesting for a switching from a bit rate that is currently being selected to another bit rate.

When the switching determination unit 32 determines that the switching requirement for switching from a relatively high bit rate to a relatively low bit rate is satisfied, the acquisition control unit 34 instructs the acquisition unit 20 to change the bit rate of a video stream to be acquired to a bit rate that is lower than the current bit rate. When the switching determination unit 32 determines that the switching requirement for switching from a relatively low bit rate to a relatively high bit rate is satisfied, the acquisition control unit 34 instructs the acquisition unit 20 to change the bit rate of the video stream to be acquired to a bit rate that is higher than the current bit rate. When a specific bit rate is specified by a switching operation from the user, the acquisition control unit 34 instructs the acquisition unit 20 to change the bit rate of the video stream to be acquired to the bit rate specified by the user.

When the switching determination unit 32 determines that a switching requirement is satisfied, the skip determination unit 36 determines to exclude from being displayed (skip the display), among pictures included in a chunk acquired after the switching of the bit rate, pictures that overlap with pictures included in a chunk that has been acquired before the switching of the bit rate and that is being reproduced. An explanation will be given in the following regarding a specific process.

The skip determination unit 36 identifies the time at which a picture to be displayed last in chronological order is displayed (the picture is also referred to a "last picture before switching" hereinafter) among pictures included in a chunk being reproduced in the reproduction unit 40 described later. In the present embodiment, when an instruction to reproduce a chunk is given from the control unit 30 to the reproduction unit 40, the PTS of a picture to be displayed last in the chunk is stored. The skip determination unit 36 specifies the PTS as the time at which the last picture before switching is displayed. In one variation, the skip determination unit 36 may make inquiries to the reproduction unit 40 regarding the PTS of a picture to be displayed last in a chunk that is being reproduced and specify the PTS as the time at which the last picture before switching is displayed.

The skip determination unit 36 identifies the time at which a picture to be displayed first in chronological order is displayed (the picture is, for example, an IDR picture and is also referred to a "first picture after switching" hereinafter) among pictures included in a chunk acquired after the switching of the bit rate. In the present embodiment, the skip determination unit 36 specifies, as the time at which the first picture after switching is displayed, the PTS assigned to a picture to be displayed first in a chunk acquired after the switching of the bit rate.

Among pictures included in a chunk acquired after the switching of the bit rate, the skip determination unit 36 determines to exclude, from being displayed, pictures to be displayed between the time at which the first picture after switching is displayed and the time at which the last picture before switching is displayed. In other words, the skip determination unit 36 determines pictures that are to be displayed before the display of the last picture before switching to be hidden. For example, as shown in FIG. 1B, when a reproduction target is switched during the reproduction of the chunk X-2 such that the chunk Y-3 is acquired, the skip determination unit 36 determines to exclude pictures of PTS of from 160 K to 190 K from being displayed. The skip determination unit 36 notifies the reproduction control unit 38 of information indicating pictures to be excluded from being displayed (the information is also referred to as "display skip information" hereinafter). For example, a PTS range of pictures to be excluded from being displayed is set for this display skip information.

At normal time when the reproduction control unit 38 is not notified of the display skip information by the skip determination unit 36, the reproduction control unit 38 transmits to the reproduction unit 40 data of a chunk of a video stream that is stored in the accumulation buffer 22 and gives an instruction to reproduce and display the entire pictures included in the chunk. This instruction is also referred to as a "normal reproduction instruction" hereinafter. When the reproduction control unit 38 is notified of the display skip information by the skip determination unit 36, the reproduction control unit 38 transmits to the reproduction unit 40 the display skip information along with data of a chunk that is stored in the accumulation buffer 22 and gives an instruction to reproduce and display pictures that are specified as display targets (those that are not excluded from being displayed) among pictures included in the chunk. This instruction is also referred to as a "selection reproduction instruction" hereinafter.

The reproduction unit 40 is a video decoder that performs a process of reproducing a video stream, more specifically, a process of decoding pictures included in the video stream and a process of displaying an image as a decoding result. The reproduction unit 40 is realized by the GPU 104 shown in FIG. 3 or the GPU 502 shown in FIG. 5. The reproduction unit 40 includes a decoding target selection unit 42, a variable-length decoding unit 44, an inverse quantizer 46, an inverse orthogonal transformation unit 48, an adder 50, a frame memory 52, a motion compensation unit 54, a sorting buffer 56, a display target selection unit 58, and a D/A converter 60.

The decoding target selection unit 42 receives a normal reproduction instruction from the control unit 30 along with data of a chunk of a video stream (the data is also referred to as "image compression information" hereinafter) that includes both data of a plurality of pictures that have been coded and motion vector information. For example, as header information thereof, this image compression information includes information indicating the PTS of each picture and information indicating whether each picture is a reference picture to be referred to at the time of decoding another picture or a non-reference picture that is not to be referred to at the time of decoding another picture. Also, the decoding target selection unit 42 receives a selection reproduction instruction from the control unit 30. In this case, the decoding target selection unit 42 receives display skip information in addition to data of a chunk (image compression information).

When the decoding target selection unit 42 receives the normal reproduction instruction, the decoding target selection unit 42 provides the image compression information directly to the variable-length decoding unit 44. On the other hand, when the decoding target selection unit 42 receives the selection reproduction instruction, the decoding target selection unit 42 first identifies coded pictures that are assigned PTSs in a range excluded from being displayed. Among those coded pictures, the decoding target selection unit 42 excludes non-reference pictures from being decoded so that only reference pictures are to be decoded. All coded pictures assigned PTSs in the range to be displayed are to be decoded regardless of whether or not the coded pictures are reference pictures. The decoding target selection unit 42 provides, to the variable-length decoding unit 44, the image compression information along with information indicating whether or not each coded picture is to be decoded. For coded pictures that are excluded from being decoded, a subsequent decoding process is canceled. For example, the coded pictures are discarded without being decoded.

The variable-length decoding unit 44 performs variable-length decoding on the image compression information, provides decoded image data to the inverse quantizer 46, and provides the motion vector information to the motion compensation unit 54. The inverse quantizer 46 inversely quantizes the decoded image data and provides the resultant to the inverse orthogonal transformation unit 48. The inverse orthogonal transformation unit 48 performs inverse discrete cosine transform (IDCT) on the DCT coefficients that are inversely quantized by the inverse quantizer 46, thereby restoring the original image data. The image data restored by the inverse orthogonal transformation unit 48 is provided to the adder 50.

If the image data provided from the inverse orthogonal transformation unit 48 represents a picture (e.g., IDR picture or I picture) that has been coded without using inter-frame prediction, the adder 50 stores the image data directly in the sorting buffer 56. At the same time, if the image data represents a reference picture, the adder 50 stores the image data in the frame memory 52 so that the image data can be referred to during the generation of a predicted image of a picture coded using inter-frame prediction.

If the image data output from the inverse orthogonal transformation unit 48 represents a picture (e.g., P picture or B picture) that has been coded using inter-frame prediction, the image data represents a differential image. Thus, the adder 50 adds the differential image and the predicted image provided from the motion compensation unit 54, thereby reconstructing the original image data and storing the restores image data in the sorting buffer 56.

The motion compensation unit 54 generates a predicted image for a P picture, a B picture, or the like by using the motion vector information provided from the variable-length decoding unit 44 and the reference picture stored in the frame memory 52 and provides the generated predicted image to the adder 50.

The sorting buffer 56 is a buffer for accumulating original images serving as resultants of the process of decoding coded pictures (the original images are also referred to as "decoded pictures" hereinafter) and sorting the decoded pictures in the order of display. For example, based on PTSs assigned to individual coded pictures, decoded pictures that correspond to individual coded pictures may be sorted.

When the decoding target selection unit 42 receives the normal reproduction instruction, the display target selection unit 58 provides data of the decoded pictures stored in the order of display in the sorting buffer 56 to the D/A converter 60 at a timing according to PTS. On the other hand, when the decoding target selection unit 42 receives the selection reproduction instruction, the display target selection unit 58 provides to the D/A converter 60 only data of decoded pictures to be displayed (in other words, decoded pictures that are not excluded from being displayed) among the decoded pictures stored in the order of display in the sorting buffer 56. More specifically, while discarding decoded pictures corresponding to coded pictures assigned PTSs in a range excluded from being displayed that are specified by the display skip information, the display target selection unit 58 provides to the D/A converter 60 decoded pictures corresponding to coded pictures assigned PTSs outside of the range.

The D/A converter 60 converts, to an analog signal, the data of the decoded pictures provided from the display target selection unit 58 and outputs the analog signal to a display apparatus such as the monitor 130 shown in FIG. 3 or the display 404 shown in FIG. 5. As described above, since the data of the decoded pictures are provided at a timing according to PTS, the reproduction and display of moving images synchronized with the setting value of the PTS can be realized.

Even when a switching requirement is determined to be satisfied in the switching determination unit 32 of the control unit 30, the reproduction unit 40 continues a reproduction process performed on chunks that have already been received from the control unit 30 until the end. In other words, regarding a chunk that is being reproduced, the display of pictures continues until the last picture included in the chunk is displayed. A process performed by the variable-length decoding unit 44 through the sorting buffer 56 shown in FIG. 6 is an example of decoding a picture, and it is obvious that a decoding process that corresponds to a publicly-known moving-image compression coding technique may be appropriately performed.

An explanation is given of the operation of the above configuration in the following.

Figure 7:
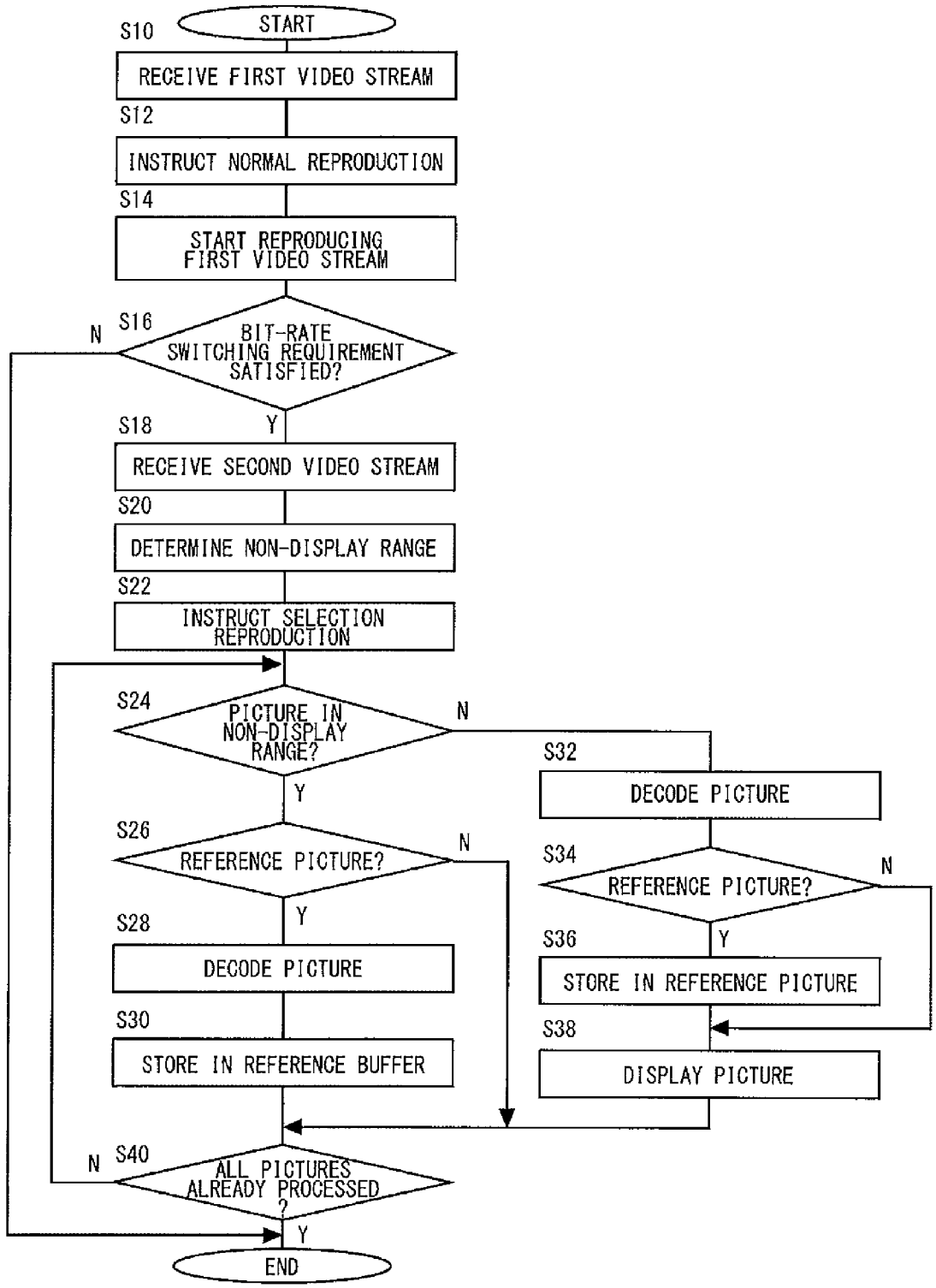
FIG. 7 is a flowchart illustrating the operation of the moving image reproduction apparatus.

FIG. 7 is a flowchart illustrating the operation of the moving image reproduction apparatus 12. The acquisition unit 20 sequentially receives, in units of chunks, a first video stream in which a moving image is coded by a first bit rate (S10). The reproduction control unit 38 of the control unit 30 provides chunks of the first video stream to the reproduction unit 40 and instructs normal reproduction (S12). The reproduction unit 40 starts a reproduction process performed on the chunks for which the normal reproduction has been instructed, decodes all the pictures included in the chunks, and sequentially displays the decoded pictures in accordance with PTS (S14).

The switching determination unit 32 of the control unit 30 constantly monitors various environmental information of the moving image reproduction apparatus 12. If the switching determination unit 32 detects that a bit-rate switching requirement has been satisfied (Y in S16), the acquisition control unit 34 instructs the acquisition unit 20 to acquire a second video stream corresponding to a second bit rate that is higher or lower than the first bit rate in accordance with the switching requirement that has been satisfied. After that, the acquisition unit 20 receives the second video stream instead of the first video stream in units of chunks from the moving image distribution server 10 (S18). The skip determination unit 36 determines a non-display range (PTS value range) by setting, among pictures included in the chunks of the second video stream, pictures that overlap with pictures included in the chunks of the first video stream being reproduced by the reproduction unit 40 to be not displayed (S20). The reproduction control unit 38 provides chunks of the second video stream to the reproduction unit 40 and instructs selection reproduction while specifying the non-display range (S22). If the bit-rate switching requirement is not satisfied (N in S16), the following processes are skipped and the flow concerning the switching of video streams that is shown in the figure is ended.

The reproduction unit 40 starts a reproduction process performed on the chunks of the second video stream. If coded pictures included in the chunks belong to the non-display range (Y in S24) and are reference pictures (Y in S26), the reproduction unit 40 decodes the pictures (S28) and stores the decoded pictures in a reference buffer (S30). The reproduction unit 40 skips displaying the decoded pictures. If the coded pictures are non-reference pictures (N in S26), the reproduction unit 40 does not perform a decoding process. On the other hand, if the coded pictures do not belong to the non-display range, in other words, if the coded pictures are assigned PTSs included in a display range (N in S24), the reproduction unit 40 decodes the pictures regardless of whether or not the pictures are reference pictures (S32). If the coded pictures are reference pictures (Y in S34), the reproduction unit 40 stores the pictures in the reference buffer (S36). If the coded pictures are non-reference pictures (N in S34), the reproduction unit 40 skips step S36 and displays the decoded pictures at a timing according to the PTSs (S38). If there are any coded pictures that are left untreated (N in S40), the reproduction unit 40 goes back to step S24. If all the coded pictures have been treated (Y in S40), the flow concerning the switching of video streams that is shown in the figure is ended.

After this, the second video stream shown in this example takes the initial position of the first video stream, and the reproduction process of reproducing a video stream is performed repeatedly starting from step S10. In other words, adaptive streaming is continued so as to continue the reproduction and display of a moving image. If the environment of the moving image reproduction apparatus 12 further changes in such a manner that the switching requirement is satisfied, a target to be acquired and reproduced goes back to the first video stream again or is switched to a third video stream that corresponds to a third bit rate different from the first and second bit rates.

Figure 8:
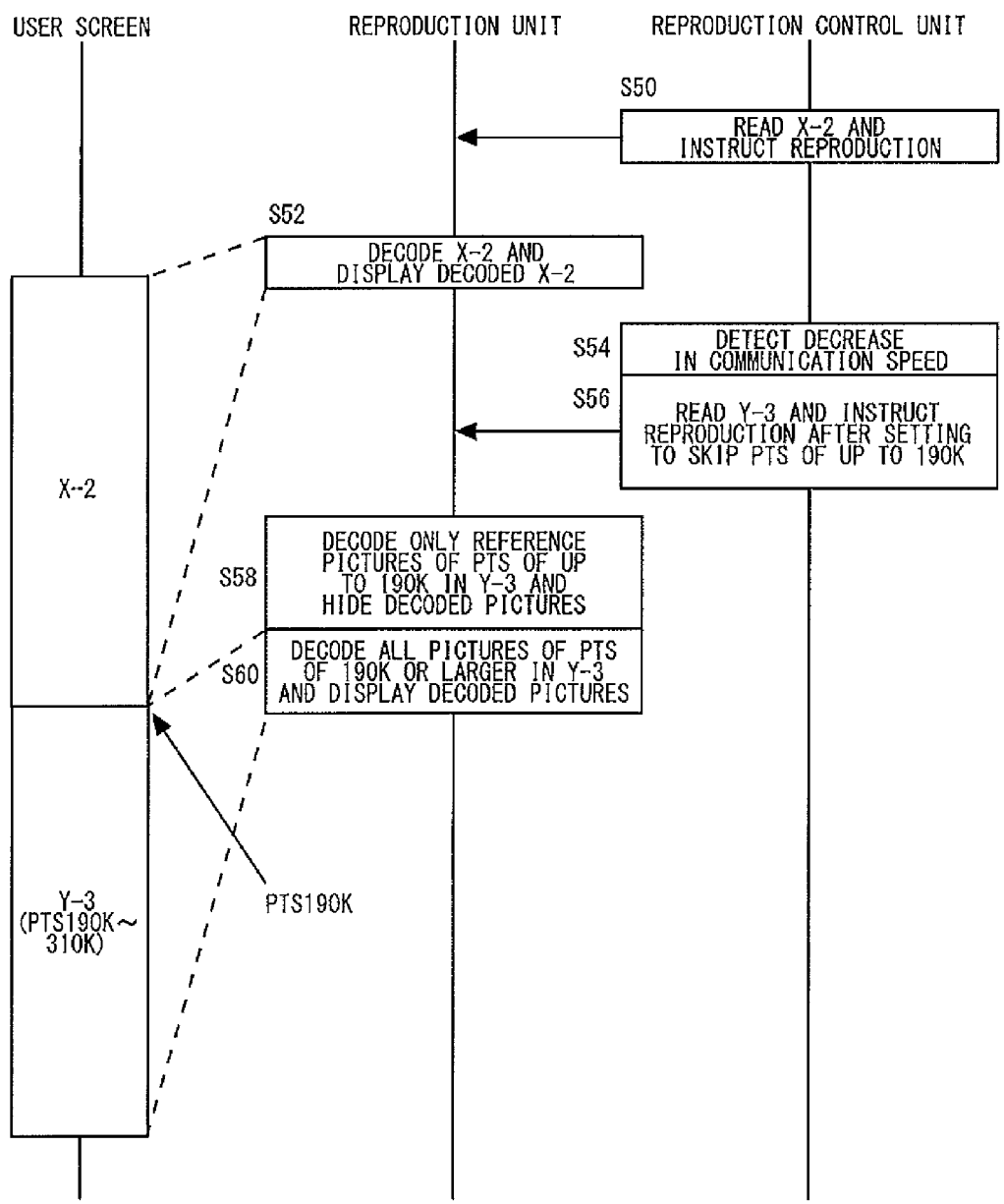
FIG. 8 is a diagram schematically illustrating process stages and contents displayed on a user screen when the bit rate of a video stream to be reproduced is switched.

FIG. 8 schematically illustrates process stages and contents displayed on a user screen when the bit rate of a video stream to be reproduced is switched. The figure shows an example where the type of a video stream to be reproduced is switched to a bit rate Y during the reproduction of a chunk X-2 shown in FIG. 1B. First, the control unit 30 reads the chunk X-2, provides the chunk to the reproduction unit 40, and gives an instruction to reproduce the chunk (S50). The reproduction unit 40 decodes the chunk X-2 and displays a resultant decoded picture on a user screen at a timing defined by PTS (S52). The PTS of a picture displayed last in a process of reproducing the chunk X-2 is 190 K (although the actual value is less than 190 K, it is assumed that the value is 190 K in the figure for the purpose of simplifying the explanation).

The control unit 30 detects a decrease in communication speed during the process of reproducing the chunk X-2 in the reproduction unit 40 (S54). The control unit 30 reads a chunk Y-3 of a video stream that corresponds to a lower bit rate and provides the chunk to the reproduction unit 40. The control unit 30 instructs not to display a range of PTS of from 160 K to 190 K in which pictures overlap between the chunk X-2 and the chunk Y-3 (S56). Regarding pictures with PTS of from 160 K to 190 K, the reproduction unit 40 decodes only reference pictures and hides the pictures, in the process of reproducing the chunk Y-3 (S58). Regarding pictures with PTS of 190 K or larger, the reproduction unit 40 decodes the pictures as usual and displays the decoded pictures on the user screen (S60). By the above processes, the decoded pictures corresponding to PTS of 190 K or larger of the chunk Y-3 are displayed on the user screen without interruption after all the decoded pictures of the chunk X-2 are displayed.

According to the moving image reproduction apparatus 12 of the present embodiment, even when the PTSs of respective sync samples do not match among video streams of different bit rates, in other words, even when the borders of chunks do not match, repetitive display of overlapping images can be prevented so as to prevent the disturbance of the display of a moving image when changing the type of a video stream. For example, in a case where an available communication bandwidth changes relatively frequently, more specifically, in viewing moving images using the portable reproduction apparatus 12*b* while traveling or in viewing moving images using best-effort communication, the type of a video stream is often changed relatively frequently. In such a case, the user-friendliness of adaptive streaming can be improved by preventing the disturbance of the display of a moving image by a moving image reproduction technology suggested in the embodiment.

In a process of reproducing a chunk obtained after the switching of the bit rate, even pictures that are to be hidden since the pictures overlap with pictures included in a chunk obtained before switching are decoded so as to be referable at the time of decoding another picture if the pictures are reference pictures, in the moving image reproduction apparatus 12. With this, the decoding of pictures to be displayed (P pictures and B pictures) can be secured. On the other hand, non-reference pictures that are to be hidden are not necessary for the decoding of another picture. Originally, those pictures are not used for a purpose other than screen display. Thus, by skipping a decoding process itself, the process of reproducing chunks obtained after the switching of the bit rate can be accelerated. In other words, it becomes easier for pictures included in a chunk obtained after switching to be in a state where the pictures can be reproduced and displayed, by the time the reproduction and display of pictures included in a chunk obtained before the switching are completed. Therefore, smooth switching display can be more easily achieved.

For example, a situation can be more easily prevented where the reproduction and display of a moving image is temporarily stopped when the reproduction and display of pictures included in a chunk obtained before switching are completed before pictures included in a chunk obtained after the switching are in a state where the pictures can be reproduced and displayed.

In the moving image reproduction apparatus 12, while control for acquisition of a video stream and control for reproduction of the video stream, for example, a process of determining whether a switching requirement is satisfied and a process of determining a non-display range, are performed in a main processor, a reproduction process of reproducing the video stream, for example, a decoding process, is performed in a graphics processor. With this, the graphics processor can more easily focus on an image operation process, and the ability thereof can be efficiently used. As a result, delay can be more easily prevented in a reproduction process (a decoding process) of reproducing a chunk obtained after the switching of the bit rate, and smooth switching display can be more easily achieved.

As a method different from that according to the present embodiment, one possible option is to constantly acquire and decode video streams of different bit rates in parallel in advance and display one video stream while hiding the other. By reversing a display and non-display relationship, the disturbance of the display of a moving image can be prevented at the time of the switching of the bit rate. However, since the acquisition and the decoding of a plurality of types of video streams are constantly performed in parallel in this method, more hardware resources are used compared to the method suggested in the present embodiment. Also, as the number of the types of bit rates increases, the amount of hardware resources used also increases. If no switching of bit rates occurs, the hardware resources will be wasted. On the other hand, in the method suggested in the present embodiment, there is only one type of bit rate that is acquired and reproduced at the same time, allowing for the management of both efficient use of hardware resources and smooth-switching display.

Described above is an explanation of the present invention based on the embodiments. These embodiments are intended to be illustrative only, and it will be obvious to those skilled in the art that various modifications to constituting elements and processes could be developed and that such modifications are also within the scope of the present invention.

For example, in the above embodiment, it is assumed that a first picture in a chunk of a video stream is a sync sample (an IDR picture). In a variation, a first picture in a chunk may not be a sync sample, in other words, the temporal position of a sync sample may be in disagreement with the border of the chunk. In this variation, timing for clearing image data of a reference picture stored in the frame memory 52 of the reproduction unit 40 is merely different from that according to the embodiment. As in the case of the embodiment, repetitive display of overlapping images can be prevented so as to prevent the disturbance of the display of a moving image when changing the type of a video stream.

Regarding the above variation, the data of a chunk of a video stream may contain index information that indicates the position (e.g., PTS value) of a sync sample that exists in the chunk. In this case, the decoding target selection unit 42 of the moving image reproduction apparatus 12 may identify, among coded pictures assigned PTSs in a range excluded from being displayed, coded pictures located before the last sync sample in the range (for example, coded pictures assigned PTSs that are earlier than that of the last sync sample). All of these coded pictures may be excluded from being decoded regardless of whether or not the coded pictures are non-reference pictures. This is because these coded pictures are not necessary for the decoding of pictures to be displayed. According to this embodiment, a reproduction process of reproducing a chunk obtained after the switching of the bit rate can be made further efficient and accelerated by further limiting the range of pictures to be decoded. As another variation, index information that indicates the position of a sync sample that exists in a chunk of a video stream may be provided from the moving image distribution server 10 to the moving image reproduction apparatus 12 separately from the data of the chunk. Furthermore, if the moving image distribution server 10 does not have the index information, the moving image reproduction apparatus 12 itself may search for the position of a sync sample included in the data of the chunk and generate index information.

Optional combinations of the aforementioned embodiment and exemplary variations will also be within the scope of the present invention. New embodiments of practicing the invention created by combinations will provide the advantages of the embodiment and variations combined.

Therefore, it will be obvious to those skilled in the art that the function to be achieved by each constituent requirement described in the claims may be achieved by each constituting element shown in the embodiments and in the modifications or by a combination of the constituting elements.

What is claimed is:

1. A moving image reproduction apparatus comprising:
   an acquisition unit configured to acquire, from a server that concurrently distributes a plurality of types of video streams in which a moving image is coded at a plurality of types of bit rates and that distributes each video stream in chunks including a plurality of pictures that constitute the moving image, a chunk of a video stream that corresponds to any one bit rate;
   an acquisition control unit configured to indicate to the acquisition unit the type of the video stream to be acquired;
   a reproduction unit configured to decode pictures included in the acquired chunk and to display the decoded pictures during a reproduction process of reproducing the video stream; and
   a reproduction control unit configured to instruct the reproduction unit to start the reproduction process,
   wherein, when a reproduction target is switched to a second video stream, which corresponds to a second bit rate, during the reproduction of a first video stream, which corresponds to a first bit rate,
   the reproduction unit continues to reproduce a chunk of the first video stream being reproduced,
   the acquisition control unit instructs the acquisition unit to acquire the second video stream instead of the first video stream,
   a time stamp that indicates a display time of a picture in the moving image is associated, respectively, in advance with each picture included in a chunk of the first video stream and each picture included in a chunk of the second video stream, and
   the reproduction control unit detects, based on respective time stamps associated with pictures included in a chunk of the second video stream and respective time stamps associated with pictures included in a chunk of the first video stream being reproduced, pictures that overlap between pictures included in a chunk of the second video stream and pictures included in the chunk of the first video stream being reproduced and instructs the reproduction unit to exclude at least a portion of the overlapping pictures from being decoded during a reproduction process performed on a chunk of the second video stream.

2. The moving image reproduction apparatus according to claim 1 wherein the acquisition control unit instructs the acquisition unit to acquire the second video stream instead of the first video stream according to a change in an available communication bandwidth.

3. The moving image reproduction apparatus according to claim 1 wherein the reproduction control unit identifies, as the overlapping pictures, pictures to be displayed before the completion of the reproduction process performed on the chunk of the first video stream being reproduced among pictures included in the chunk of the second video stream.

4. The moving image reproduction apparatus according to claim 1 wherein the reproduction unit decodes and then hides, among the overlapping pictures, reference pictures that are referred to at the time of decoding another picture and excludes from decoding, among the overlapping pictures, non-reference pictures that are not referred to at the time of decoding another picture during the reproduction process performed on a chunk of the second video stream.

5. An information processing apparatus comprising:
   a main processor configured to control the entire apparatus in an integrated manner; and
   a graphics processor configured to perform an image processing operation,
   wherein the main processor acquires, from a server that concurrently distributes a plurality of types of video streams in which a moving image is coded at a plurality of types of bit rates and that distributes each video stream in chunks including a plurality of pictures that constitute the moving image, a chunk of a video stream that corresponds to any one bit rate and then performs a process of instructing the graphic processor to start a reproduction process of reproducing the acquired chunk of the video stream,
   wherein the graphics processor performs a process of decoding pictures included in the acquired chunk and displaying the decoded pictures during the reproduction process of reproducing the video stream, and
   wherein, when a reproduction target is switched to a second video stream, which corresponds to a second bit rate, during the reproduction of a first video stream, which corresponds to a first bit rate,
   the graphics processor continues to reproduce a chunk of the first video stream being reproduced,
   a time stamp that indicates a display time of a picture in the moving image is associated, respectively, in advance with each picture included in a chunk of the first video stream and each picture included in a chunk of the second video stream, and
   the main processor acquires the second video stream instead of the first video stream, detects, based on respective time stamps associated with pictures included in a chunk of the second video stream and respective time stamps associated with pictures included in a chunk of the first video stream being reproduced, pictures that overlap between pictures included in a chunk of the second video stream and pictures included in the chunk of the first video stream being reproduced, and instructs the graphics processor to exclude from being decoded at least a portion of the overlapping pictures during a reproduction process performed on a chunk of the second video stream.

6. A moving image reproduction method comprising:
acquiring, from a server that concurrently distributes a plurality of types of video streams in which a moving image is coded at a plurality of types of bit rates and that distributes each video stream in chunks including a plurality of pictures that constitute the moving image, a chunk of a first video stream that corresponds to a first bit rate;
decoding pictures included in the chunk and displaying the decoded pictures during a reproduction process of reproducing the first video stream; and
acquiring, when a reproduction target is switched to a second video stream that corresponds to a second bit rate during the reproduction of the first video stream, a chunk of the second video stream;
wherein a time stamp that indicates a display time of a picture in the moving image is associated, respectively, in advance with each picture included in a chunk of the first video stream and each picture included in a chunk of the second video stream, and comprising:
performing a reproduction process of reproducing the second video stream,
wherein, based on respective time stamps associated with pictures included in a chunk of the second video stream and respective time stamps associated with pictures included in a chunk of the first video stream being reproduced, pictures that overlap between pictures included in a chunk of the second video stream and pictures included in the chunk of the first video stream being reproduced are detected, and
wherein at least a portion of the overlapping pictures are exclude from being decoded.

7. A computer program embedded in a non-transitory computer readable recording medium, comprising:
an acquisition module configured to acquire, from a server that concurrently distributes a plurality of types of video streams in which a moving image is coded at a plurality of types of bit rates and that distributes each video stream in chunks including a plurality of pictures that constitute the moving image, a chunk of a video stream that corresponds to any one bit rate;
an acquisition control module configured to indicate to the acquisition module the type of the video stream to be acquired;
a reproduction module configured to decode pictures included in the acquired chunk and to display the decoded pictures during a reproduction process of reproducing the video stream; and
a reproduction control module configured to instruct the reproduction module to start the reproduction process,
wherein, when a reproduction target is switched to a second video stream, which corresponds to a second bit rate, during the reproduction of a first video stream, which corresponds to a first bit rate,
the reproduction module continues to reproduce a chunk of the first video stream being reproduced,
the acquisition control module instructs the acquisition module to acquire the second video stream instead of the first video stream,
a time stamp that indicates a display time of a picture in the moving image is associated, respectively, in advance with each picture included in a chunk of the first video stream and each picture included in a chunk of the second video stream, and
the reproduction control module detects, based on respective time stamps associated with pictures included in a chunk of the second video stream and respective time stamps associated with pictures included in a chunk of the first video stream being reproduced, pictures that overlap between pictures included in a chunk of the second video stream and pictures included in the chunk of the first video stream being reproduced and instructs the reproduction module to exclude from being decoded at least a portion of the overlapping pictures during a reproduction process performed on a chunk of the second video stream.

* * * * *